(No Model.)
W. H. STEAD.
TREATING COTTON SEED TO REMOVE THE LINT.
No. 340,635. Patented Apr. 27, 1886.
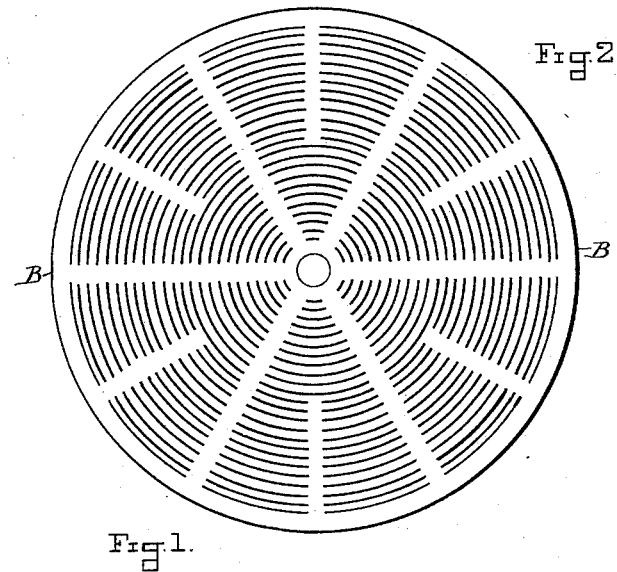
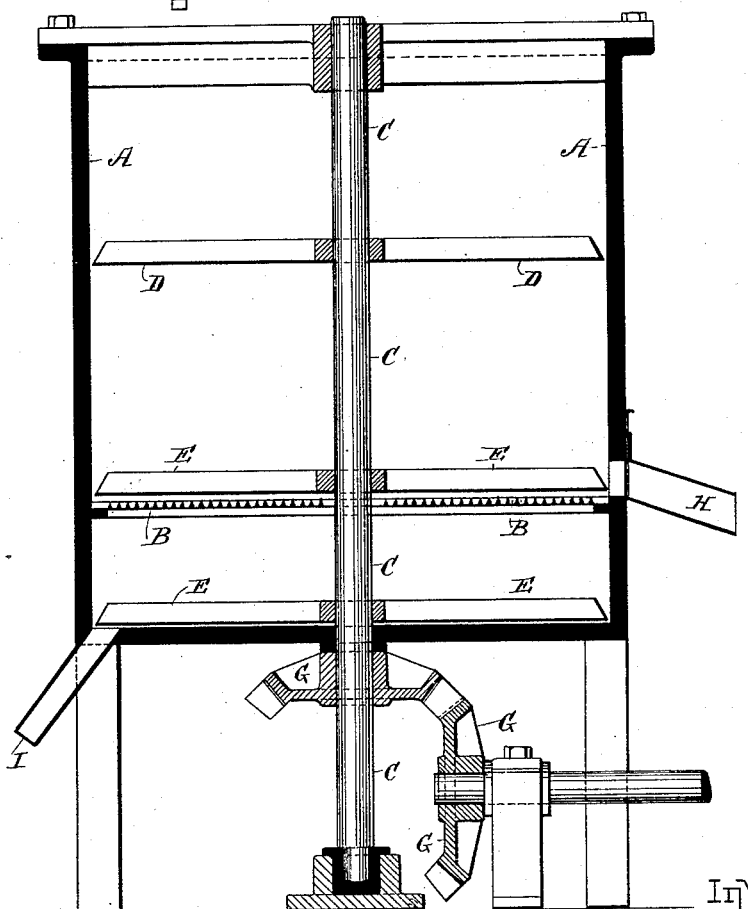

UNITED STATES PATENT OFFICE.

WILLIAM HENRY STEAD, OF LIVERPOOL, COUNTY OF LANCASTER, ENGLAND.

TREATING COTTON-SEED TO REMOVE THE LINT.

SPECIFICATION forming part of Letters Patent No. 340,635, dated April 27, 1886.

Application filed November 18, 1884. Serial No. 148,250. (No model.)

*To all whom it may concern:*

Be it known that I, WILLIAM HENRY STEAD, of Liverpool, in the county of Lancaster, England, have invented certain new and useful Improvements in Treating Cotton-Seed to Remove the Lint, of which the following is a specification.

Various processes, mechanical or chemical, or both combined, have been devised of late for removing the short adhering fiber from cotton-seed. The chemical processes consist in cleaning the seed by the use of a bath of dilute sulphuric acid and heat or alkali. The seed is required to be carefully washed and dried after either of these operations.

Now my process consists in using ordinary undiluted commercial sulphuric acid in just sufficient quantity to slightly moisten the cotton-seed all over, and then neutralizing by means of a dry alkaline earth, preferably lime.

The mode of operating which I prefer is as follows, reference being had to the drawings, in which Figure 1 represents a vertical central section of the pan and stirrers, and Fig. 2 represents a plan view of the sieve used.

I employ, preferably, a cylindrical pan, A, having a false bottom, B, perforated with numerous small holes or slits, concentric or otherwise, about one-eighth of an inch wide, for the passage of dust. In this pan the cotton-seed is placed.

C is a vertical shaft armed with stirrers D and two scrapers, E. This shaft passes through the pan and chamber below the false bottom, and is driven by belt and pulley, or by gearing G, as shown, so as to rotate at any required speed.

H is the exit-spout for cotton-seed; I, the exit-spout for dust.

The pan is filled with seed to a convenient height and the stirrers set in motion. While the stirrers are in motion the seed is sprinkled with undiluted sulphuric acid. A convenient mode of doing this is by means of a perforated copper pipe placed horizontally across the top of the pan. The quantity of acid used varies according to the quantity of cotton-lint adhering to the seed to be worked, the proportions ranging from two and one-half to four pounds of acid to each one hundred pounds of seed. The stirring is continued until the lint has become detached from the seed in the form of a fine powder or dust, which gradually makes its way from the pan through the holes in the false bottom and the exit-spout I. With this powder is also removed a large proportion of the acid with which the seed has been sprinkled. Following this, and before the seed is removed, it is sprinkled with a dry powdered alkaline earth, preferably lime, the stirring being continued throughout the whole operation. The powdered alkaline earth mixes thoroughly with the seed and neutralizes whatever acid may remain upon the seed, then passes away through the false bottom and exit-spout I in the form of a powder or dust, leaving the seed in the pan dry and clean, with the exception of a thin coating of lime-dust, which can be readily removed by means of a brush and screen. Should there be too much dust coming from the pan at any time during the process, I find it convenient to sprinkle the mass with water, which evaporates so rapidly that the seed is never really wet. When the operation is over, the seed is discharged through the exit-spout H.

The main advantage of my process is that, owing to so little moisture being used in the operation, the chemicals employed, as well as the lint, leave the seed in the form of powder, and the seed being both clean and dry no subsequent washing or drying process is required. The seed is thus much less liable to be injured than by the existing wet processes, and much costly manipulation and waste of fuel in drying are saved.

I claim as my invention—

1. The dry process of cleaning cotton-seed herein described, which consists in bringing commercial sulphuric acid, without submersion and consequent soaking, into contact with the fiber only by simultaneously spreading or spraying the mass and stirring it until the fiber is partially saturated, and then treating the mass under agitation with alkaline earth, whereby the lint or fiber is removed in the form of dust and the acid remaining on the surface of the seed is neutralized and the resultant sulphate removed without washing and consequent dampening, as set forth.

2. The dry process of cleaning cotton-seed herein described, which consists in treating the mass with commercial sulphuric acid without submersion and consequent soaking of the shell by the acid, then treating the mass with pulverized lime, and then brushing the same, whereby the lint is removed in the form of dust, the acid neutralized without soaking, and the sulphate of lime is removed by friction, substantially as set forth.

3. The dry process of cleaning cotton-seed, which consists in bringing commercial sulphuric acid without submersion into contact with the fiber, stirring the mass until the fiber is separated from the seed in the form of powder or dust, and then treating the mass under agitation with dry alkaline earth.

In testimony whereof I have signed my name to this specification in the presence of two subscribing witnesses.

WILLIAM HENRY STEAD.

Witnesses:
F. T. EVANS,
F. C. LIVERSEDGE.